(12) United States Patent
Lin (10) Patent No.: US 10,486,648 B1
(45) Date of Patent: Nov. 26, 2019

(54) PASSIVE KEYLESS ENTRY SYSTEM

(71) Applicant: BCS ACCESS SYSTEMS US, LLC, Wilmington, DE (US)

(72) Inventor: Xing Ping Lin, West Bloomfield, MI (US)

(73) Assignee: BCS ACCESS SYSTEMS US, LLC, Wilmington, DE (US)

( * ) Notice: Subject to any disclaimer, the term of this patent is extended or adjusted under 35 U.S.C. 154(b) by 0 days.

(21) Appl. No.: 16/044,647

(22) Filed: Jul. 25, 2018

(51) Int. Cl.
| | |
|---|---|
| *B60R 25/24* | (2013.01) |
| *G07C 9/00* | (2006.01) |
| *H04B 1/69* | (2011.01) |

(52) U.S. Cl.
CPC .......... *B60R 25/246* (2013.01); *B60R 25/248* (2013.01); *G07C 9/00309* (2013.01); *H04B 1/69* (2013.01); *G07C 2009/00555* (2013.01); *H04B 2001/6912* (2013.01)

(58) Field of Classification Search
CPC . B60R 25/246; B60R 25/248; G07C 9/00309; G07C 2009/00388; G07C 2009/00404; G07C 2009/0042; G07C 2009/00412; G07C 2009/00555; G07C 9/00658; H04B 1/69; H04B 2001/6912
USPC .......... 340/5.72, 426.36, 5.61, 5.63
See application file for complete search history.

(56) References Cited

U.S. PATENT DOCUMENTS

| | | | | |
|---|---|---|---|---|
| 2002/0158748 | A1* | 10/2002 | Vollhardt | B60R 25/24 340/5.26 |
| 2006/0044108 | A1* | 3/2006 | Nowottnick | B60R 25/24 340/5.61 |
| 2015/0280843 | A1* | 10/2015 | Fucci | H04B 17/27 455/41.2 |
| 2018/0288092 | A1* | 10/2018 | Linsky | H04L 63/1466 |

* cited by examiner

*Primary Examiner* — Edwin C Holloway, III
(74) *Attorney, Agent, or Firm* — Tarolli, Sundheim, Covell & Tummino LLP (57) ABSTRACT

A passive keyless entry system for an electronic lock, comprises a lock installation including a lock controller, and an RF transmitter and receiver, and a fob with a controller, and an RF transmitter and receiver. The fob generates messages to unlock the lock in an unlock event. The controllers share a secret specifying parameters for a sequence of messages to be exchanged bidirectionally between the installation and the fob, the parameters changing between each unlock event and an immediately subsequent unlock event. For each unlock event one of the controllers generates and sends a first message of the message sequence, in accordance with the specified parameters. The other controller causes transmission of a second message of the sequence in accordance with the specified parameters, in response to receiving the first message. At least one message of the sequence comprises a plurality of frames, each frame including a particular sequence of bits, adjacent frames being separated by an inter-frame interval. Adjacent messages in the sequence being separated by an inter-message interval. The specified parameters are such that a given message of the sequence includes a first inter- (Continued)

frame interval, and the inter-message interval between said given message of the sequence and the immediately preceding or immediately subsequent message is no longer than said first inter-frame interval.

29 Claims, 7 Drawing Sheets

PASSIVE KEYLESS ENTRY SYSTEM

TECHNICAL FIELD

The present invention relates to a passive keyless entry system, and in particular to a passive keyless entry system for a vehicle.

BACKGROUND

Keyless entry systems, in which a key fob or key includes an RF transmitter which is used to communicate with a corresponding receiver in the vehicle to lock or unlock the vehicle doors have proved to be a very popular option for motor vehicles. Initially, these systems required a pushbutton or other actuator on the key fob to be actuated in order to lock or unlock the doors of the vehicle. Subsequently, however, so-called passive keyless entry systems have been devised in which no user interaction with the key fob is required in order to unlock or lock the doors of the vehicle when the user is close to the vehicle. Such systems work either by detecting the proximity of the fob to the vehicle transmitter and the vehicle sending out periodic beacon signals which when detected by a key fob cause the key fob to wake up and provide a response. If the response is from a paired key fob, the vehicle doors are unlocked. Other passive keyless entry systems require the user to touch or come close to a door handle of the car, capacitive sensing being used to detect presence, causing the vehicle to send a wake-up message to the key fob. The key fob provides a response, and if the key fob is a paired key fob the vehicle doors are unlocked. The fobs of such systems may also include push buttons, or equivalent actuators, to enable the user to cause the fob to transmit a signal to the vehicle from a greater distance, to lock or unlock the car—or even to start the vehicle remotely.

Although keyless entry systems have in general improved vehicle security, compared to the use of conventional mechanical keys, passive keyless entry systems have been found to have a security weakness. That weakness is known as a "relay attack". In a relay attack, two potential thieves work together. One of the thieves stands close to the vehicle, while the other thief positions herself close to the owner of the vehicle who is carrying the key fob. Each of the thieves has a radio frequency device, the two devices being connected either through a physical cable or, more commonly, through another radiofrequency link. The thief by the vehicle approaches the vehicle and, if necessary, lifts or touches the door handle. This action triggers a low-frequency transmitter inside the car to send out a wake-up signal. The thief's radiofrequency device receives the wake-up signal and forwards it to the device of the other thief. The wake-up signal is then transmitted by the second thief's radiofrequency device which is within range of the key fob. The key fob, receiving the forwarded wake-up signal, responds and the signal emitted by the fob is received by the second thief's RF device and is forwarded to the first thief's device. The first thief's device emits the forwarded response from the key fob, fooling the system mounted in the car into believing that the key fob is located sufficiently close the car, so the car's doors are unlocked. The same process is effective in fooling the car systems into believing that the fob is present, thereby allowing the car to be started and driven away.

The present invention seeks to make such relay attacks less successful.

SUMMARY OF THE INVENTION

In a first embodiment, the present invention provides a passive keyless entry system for an electronic lock, the system comprising: a lock installation including a first controller, a first RF transmitter and a first RF receiver; and a fob including a fob controller, a second RF transmitter and a second RF receiver, the fob being configured to generate messages to unlock the lock in an unlock event; wherein: the first controller and the fob controller share a secret that specifies parameters for a sequence of messages to be exchanged bidirectionally between the lock installation and the fob using the first RF transmitter and the second RF receiver, and the second RF transmitter and the first RF receiver, the parameters changing between each unlock event and an immediately subsequent unlock event; wherein for each unlock event one of the first controller and the fob controller is configured to generate a first message of the message sequence, in accordance with the specified parameters, and to cause one of the first or second RF transmitter to transmit the first message of the sequence in accordance with the specified parameters; and the other of the first controller and the fob controller is configured to control the other of the first RF transmitter and the second RF transmitter to transmit a second message of the sequence in accordance with the specified parameters, in response to receiving the first message of the sequence; and the first controller is further configured only to unlock the electronic lock in the event that the or each message transmitted by the fob as required by the sequence is correctly received by the first receiver; and wherein at least one message of the sequence of messages comprises a plurality of frames, each frame including a particular sequence of bits, adjacent frames of the plurality of frames being separated from each other by an inter-frame interval; adjacent messages in the sequence of messages being separated from each other by an inter-message interval; and the specified parameters are such that a given message of the sequence includes a first inter-frame interval, and the inter-message interval between said given message of the sequence and at least one of an immediately preceding and an immediately subsequent message is no longer than said first inter-frame interval.

By introducing inter-frame intervals within messages of the sequence it becomes more difficult for an attacker to tell whether a gap in transmission signifies a change of transmission direction. The attacker cannot therefore safely switch the transmission direction of their equipment when detecting a gap in transmission. The attacker is therefore likely to create a feedback loop. Making at least some of the inter-frame and inter-message intervals comparable in duration makes the attacker's task even harder.

Optionally the given message of the sequence of messages may include at least three frames, and different pairs of adjacent frames are separated by inter-frame intervals having different durations. This compounds the difficulties faced by an attacker.

Optionally, an inter-message interval between said given message of the sequence and an immediately preceding or immediately subsequent message of the sequence has a duration intermediate the durations of the inter-frame intervals of said given message of the sequence of messages. This further compounds the difficulties faced by an attacker.

Advantageously, the first controller is configured to share the secret between the first controller and the fob controller by controlling the first RF transmitter to send to the second RF receiver a first encrypted message specifying the parameters for the sequence of messages. Supplying, or updating, the shared secret in this way means that it is likely to be more difficult for attackers to uncover the secrets controlling message sequences. This further improves security.

Optionally, the first and second RF transmitters operate on the same RF carrier frequency, making it harder for attackers to discriminate between signals originating with the lock installation and those originating with the fob.

Preferably, the first controller is configured to specify a different set of parameters for each attempt to unlock the electronic lock. In this way, it is made harder for attackers to predict the details of the sequence, and therefore harder to defeat the system.

Optionally, the parameters specified in the encrypted message include at least one of:

an indication whether the first or the second RF transmitter is to transmit a first message of the sequence; a start time for each message in the sequence; a duration for each message in the sequence; a duration for an interval between adjacent messages in the sequence. By being able to choose between these various parameters, the system can be made more difficult for an attacker to overcome.

The parameters specified in the encrypted message may include an indication whether the first or the second RF transmitter is to transmit a first message of the sequence, and at least one of a start time for each message in the sequence and a duration for each message in the sequence. Having a system in which the source of the first message of the sequence varies, and varying at least one of the start time and duration of each message of the sequence, can also increase the difficulty of defeating the system.

The first controller may be configured to control the first RF transmitter to send to the second RF receiver the encrypted message specifying parameters for a sequence of messages only after the first controller has recognized the fob as having been paired with the first controller. Such an approach improves the security of the system by preventing the transmission of the encrypted messages when no paired fob is detected. With such an arrangement, the lock installation may additionally include a low frequency transmitter to transmit a wake up message the fob.

The first RF transmitter and the first RF receiver may be configured as a first RF transceiver, which may permit a more compact installation, and reduce costs by avoiding duplication of some components. Similarly, the second RF transmitter and the second RF receiver may be configured as a second RF transceiver.

By encrypting the message used to transmit the parameters from the lock installation to the fob, the fob having a key to permit the fob to decrypt the message, the security of systems according to embodiments the invention can be improved by making it harder for attackers to anticipate how the system will behave.

The electronic lock may be a lock of a vehicle, but may equally well be a lock of a room, building, or other structure or equipment.

In a further embodiment of the invention there is provided an electronic lock installation configured for passive keyless entry, the lock installation including:

an electronic lock, an RF transmitter and an RF receiver for communication with a fob that is configured to generate messages to unlock the lock in an unlock event, and a controller operatively coupled to the lock, the RF transmitter and the RF receiver; wherein the controller shares a secret with the fob, the secret specifying parameters for a sequence of messages to be exchanged bidirectionally between the lock installation and the fob using the RF transmitter and the RF receiver, the parameters changing between each unlock event and an immediately subsequent unlock event; control the RF transmitter to send to the fob at least one message of the sequence in accordance with the specified parameters; control the RF receiver to receive at least one message of the sequence transmitted by the fob in accordance with the specified parameters; and wherein at least one message of the sequence of messages comprises a plurality of frames, each frame including a particular sequence of bits, adjacent frames of the plurality of frames being separated from each other by an inter-frame interval; adjacent messages in the sequence of messages being separated from each other by an inter-message interval; and the specified parameters are such that a given message of the sequence includes a first inter-frame interval, and the inter-message interval between said given message of the sequence and at least one of an immediately preceding and an immediately subsequent message is no longer than said first inter-frame interval, and the controller is further configured only to unlock the electronic lock in the event that the or each message transmitted by the fob as required by the sequence is correctly received by the RF receiver.

In such an installation, the secret may be shared between the first controller and the fob controller by the first controller controlling the first RF transmitter to send to the second RF receiver an encrypted message specifying the parameters for the sequence of messages. Supplying, or updating, the shared secret in this way means that it is likely to be more difficult for attackers to uncover the secrets controlling message sequences. This further improves security.

In such an installation, the controller may be configured to send a new encrypted message, specify a different set of parameters, for each attempt to unlock the electronic lock. While one message may be used to update parameters which can be used for a series of attempts to unlock the lock, multiple sets of parameters being provided in a single message, it is preferable at least in terms of message length, to supply just one set of parameters in a single message. Changing the parameters for each unlock attempt makes it harder for an attacker to launch a successful relay attack.

In such an installation, the controller may be configured to specify a different set of parameters for each attempt to unlock the electronic lock. In this way, it is made harder for attackers to predict the details of the sequence, and therefore harder to defeat the security of the lock installation.

Optionally, the parameters specified in the encrypted message may include at least one of: an indication whether the fob or the RF transmitter is to transmit a first message of the sequence; a start time for each message in the sequence; a duration for each message in the sequence; a duration for an interval between adjacent messages in the sequence. By being able to choose between these various parameters, the installation can be made more difficult for an attacker to overcome.

Optionally, the parameters specified in the encrypted message may include an indication whether the fob or the RF transmitter is to transmit a first message of the sequence, and at least one of a start time for each message in the sequence and a duration for each message in the sequence. Having an installation in which the source of the first message of the sequence varies, and varying at least one of the start time and duration of each message of the sequence, can also increase the difficulty of defeating the system.

In a further embodiment of the invention there is provided a fob for a passive keyless entry system for an electronic lock, the fob including a fob controller, a low frequency receiver, an RF transmitter and an RF receiver, the fob being configured to generate messages to unlock the lock in an unlock event; wherein: the fob controller and a lock installation of the electronic lock share a secret specifying parameters for a sequence of messages to be exchanged bidirectionally between the lock installation and the fob, using the RF transmitter and the RF receiver, at least one of the messages of the sequence being specified as coming from the fob, the parameters changing between each unlock event and an immediately subsequent unlock event; at least one message of the sequence of messages comprises a plurality of frames, each frame including a particular sequence of bits, adjacent frames of the plurality of frames being separated from each other by an inter-frame interval; adjacent messages in the sequence of messages being separated from each other by an inter-message interval; the specified parameters are such that a given message of the sequence includes a first inter-frame interval, and the inter-message interval between said given message of the sequence and at least one of an immediately preceding and an immediately subsequent message is no longer than said first inter-frame interval; the fob controller is configured to wake up in the event that the low frequency receiver receives a low-frequency wake up message from the lock installation, and to cause the RF transmitter to transmit a response to the installation, the response including a fob identifier; and the controller is configured subsequently to control the RF transmitter to send to the lock installation the or each message of the sequence specified as coming from the fob, in accordance with the specified parameters.

By having both the fob and the lock installation transmit messages in a sequence according to specified parameters, since the switch time of communication direction unknown to the attackers, attackers may be forced to capture and relay signals continuously at both ends of the system—which is likely to give rise to feedback loops, making it likely that feedback will swamp signals or/and distort bit symbol of the signals obtained from the fob or vehicle side during the relay attack. This in turn makes it less likely that the relay attack will succeed.

Optionally the fob may be configured to receive the specified parameters in an encrypted message from the lock installation. Supplying, or updating, the shared secret in this way means that it is likely to be more difficult for attackers to uncover the secrets controlling message sequences. This further improves security.

The fob controller may be configured to apply the specified parameters supplied in a given encrypted message to just one unlock event. Changing the parameters for each unlock attempt makes it harder for an attacker to launch a successful relay attack.

Optionally, the controller may be configured to control at least one of a start time or a duration of a message to be transmitted by the RF transmitter as part of the sequence. By being able to choose between these various parameters, the system can be made more difficult for an attacker to overcome.

In a further embodiment of the invention there is provided a method of preventing a successful relay attack on a passive keyless entry system for an electronic lock of a lock installation, the system including a fob configured to generate messages to unlock the lock in an unlock event, the method comprising:

for each unlock event controlling one of a first RF transmitter associated with the lock and a second RF transmitter of the fob to generate a first message of a message sequence, in accordance with parameters specified in a secret shared between a fob controller and a first controller of the lock installation; controlling the other of the first RF transmitter and the second RF transmitter to transmit a second message of the sequence in accordance with the specified parameters, in response to receiving the first message of the sequence; changing the sequence of parameters of the sequence for each iteration of the method, but each sequence interleaving transmissions from the first and second RF transmitters; and only unlocking the electronic lock in the event that the or each message transmitted by the fob as required by the sequence is correctly received by an RF receiver of the lock installation; wherein the specified parameters are such that a given message of the sequence includes a first inter-frame interval, and the inter-message interval between said given message of the sequence and at least one of an immediately preceding and an immediately subsequent message is no longer than said first inter-frame interval.

By having both the fob and the lock installation transmit messages, and interleaving these in a sequence according to specified parameters, attackers may be forced to capture signals continuously at both ends of the system—which is likely to give rise to feedback loops, making it likely that feedback will swamp signals or/and distort bit symbol of the signals obtained from the fob during the relay attack. This in turn makes it less likely that the relay attack will succeed.

Optionally, the method may include controlling the first RF transmitter to send to the fob an encrypted message specifying the parameters for the sequence of messages. Supplying, or updating, the shared secret in this way means that it is likely to be more difficult for attackers to uncover the secrets controlling message sequences. This further improves security.

Optionally, the method may include sending a new encrypted message, specify a different set of parameters, for each attempt to unlock the electronic lock. Changing the parameters for each unlock attempt makes it harder for an attacker to launch a successful relay attack.

Optionally, the parameters specified in the encrypted message may include at least one of: an indication whether the fob or the RF transmitter is to transmit a first message of the sequence; a start time for each message in the sequence; a duration for each message in the sequence; a duration for an interval between adjacent messages in the sequence.

Optionally, the parameters specified in the encrypted message may include an indication whether the fob or the RF transmitter is to transmit a first message of the sequence; and at least one of a start time for each message in the sequence and a duration for each message in the sequence. By being able to choose between these various parameters, particularly by enabling the system to select different starting points for the bidirectional transmission sequence, the method can be made more difficult for an attacker to overcome.

In another embodiment, the present invention provides a passive keyless entry system for an electronic lock, the system comprising:

a lock installation including a first controller, a first RF transmitter and a first RF receiver; and a fob including a fob controller, a second RF transmitter and a second RF receiver; wherein:

the first controller is configured to control the first RF transmitter to send to the second RF receiver a first message specifying parameters for a sequence of messages to be exchanged bidirectionally between the lock installation and the fob using the first RF transmitter and the second RF receiver, and the second RF transmitter and the first RF receiver;

the fob controller is configured to respond to receiving the first message by controlling the second RF transmitter to send to the first RF receiver at least one message of the sequence in accordance with the specified parameters;

the first controller is configured to control the first RF transmitter to send to the second RF receiver at least one message of the sequence in accordance with the specified parameters; and the first controller is further configured only to unlock the electronic lock in the event that the or each message transmitted by the fob as required by the sequence is correctly received by the first receiver;

at least one message of the sequence of messages comprising a plurality of frames, each frame including a particular sequence of bits, adjacent frames of the plurality of frames being separated from each other by an inter-frame interval;

adjacent messages in the sequence of messages being separated from each other by an inter-message interval, wherein the specified parameters are such that a given message of the sequence includes a first inter-frame interval, and the inter-message interval between said given message of the sequence and a subsequent message adjacent to the given message of the sequence is no longer than said first inter-frame interval.

Optionally, said first message of the sequence of messages includes at least three frames, and different pairs of adjacent frames are separated by inter-frame intervals having different durations. Optionally, the inter-message interval between said first message of the sequence and the subsequent message adjacent to the first message of the sequence has a duration intermediate the durations of the inter-frame intervals of said first message of the sequence of messages.

In an alternative embodiment, the present invention provides a passive keyless entry system for an electronic lock, the system comprising: a lock installation including a first controller, a first RF transmitter and a first RF receiver; and a fob including a fob controller, a second RF transmitter and a second RF receiver; wherein: the first controller is configured to control the first RF transmitter to send to the second RF receiver a first message specifying parameters for a sequence of messages to be exchanged bidirectionally between the lock installation and the fob using the first RF transmitter and the second RF receiver, and the second RF transmitter and the first RF receiver;

the fob controller is configured to respond to receiving the first message by controlling the second RF transmitter to send to the first RF receiver at least one message of the sequence in accordance with the specified parameters;

the first controller is configured to control the first RF transmitter to send to the second RF receiver at least one message of the sequence in accordance with the specified parameters; and the first controller is further configured only to unlock the electronic lock in the event that the or each message transmitted by the fob as required by the sequence is correctly received by the first receiver.

By having both the fob and the lock installation transmit messages in a sequence according to specified parameters that are not known to would-be relay attackers, the attackers may be forced to capture and relay signals continuously at both ends of the system—which is likely to give rise to feedback loops, making it likely that feedback will swamp signals or/and distort bit symbol of the signals obtained from the fob during the relay attack. This in turn makes it less likely that the relay attack will succeed.

BRIEF DESCRIPTION OF THE DRAWINGS

Embodiments of the invention will now be described, by way of example only, with reference to the accompanying drawings, in which.

DESCRIPTION OF EMBODIMENTS

Figure 1:
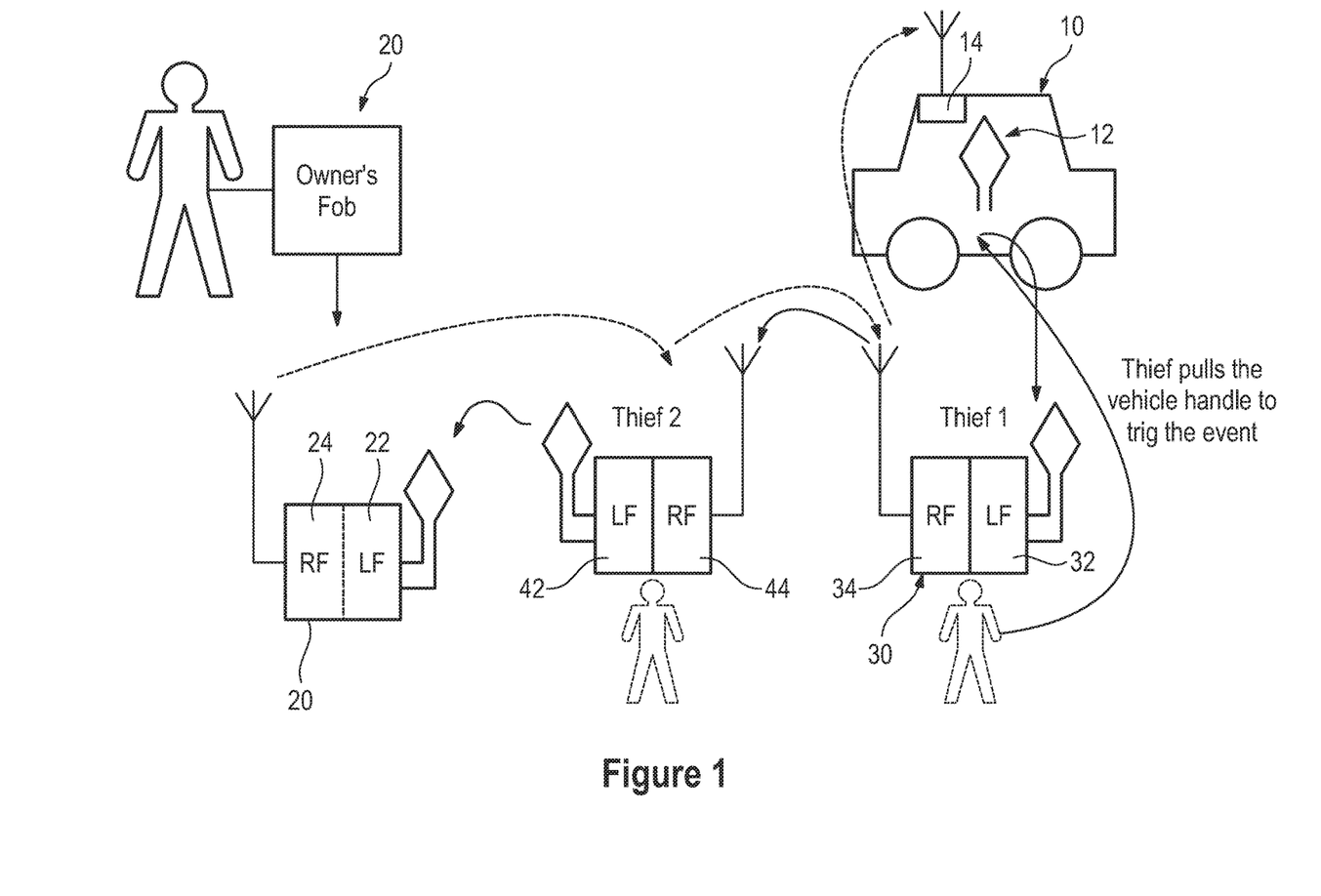
FIG. 1 illustrates the classic relay attack method.

FIG. 1 illustrates schematically the classic relay attack on a vehicle fitted with a passive keyless entry system. Car 10 includes a low-frequency transmitter 12 and a radiofrequency receiver 14. A driver having a key fob 20 which includes a low frequency receiver 22, and a radiofrequency transmitter 24, has walked away from the vehicle so that the fob and car are no longer in range of each other. Two thieves will attempt to steal the car. The first thief takes up position by the car, while the second thief takes up position near the car owner who is carrying the key fob. When the two thieves are in position, the first thief touches the handle of the driver's door of the car causing a controller in the car to activate the low-frequency transmitter which sends a wake-up signal intended for the fob. The first thief has equipment 30 which includes a low frequency receiver 32 which can receive the wake-up signal. The first thief's equipment 30 also includes a higher frequency RF transceiver 34 to onward transmit the wake-up signal to the second thief. The second thief has equipment 40 which includes an RF transceiver 44 for communication with the RF transceiver 34 of the first equipment. The second thief's equipment 40 also includes a low-frequency transmitter 22. The second thief's equipment receives the forwarded wake-up signal, converts it back to low-frequency and then transmits it to be received by the low-frequency receiver 22 of the fob. The fob 20 responds to the forwarded wake-up signal by emitting the appropriate response from RF transmitter 24. The RF transceiver 44 of the second thief's equipment 40 receives the fob's response and then retransmits this to the RF transceiver 34 of the first thief and the controller equipment. The first thief's RF transceiver receives the forwarded command signal and retransmits it to the RF receiver 14 inside the car. The car's receiver recognizes the command and unlocks the car door. The first thief thereby gains successful access to the car.

Figure 2:
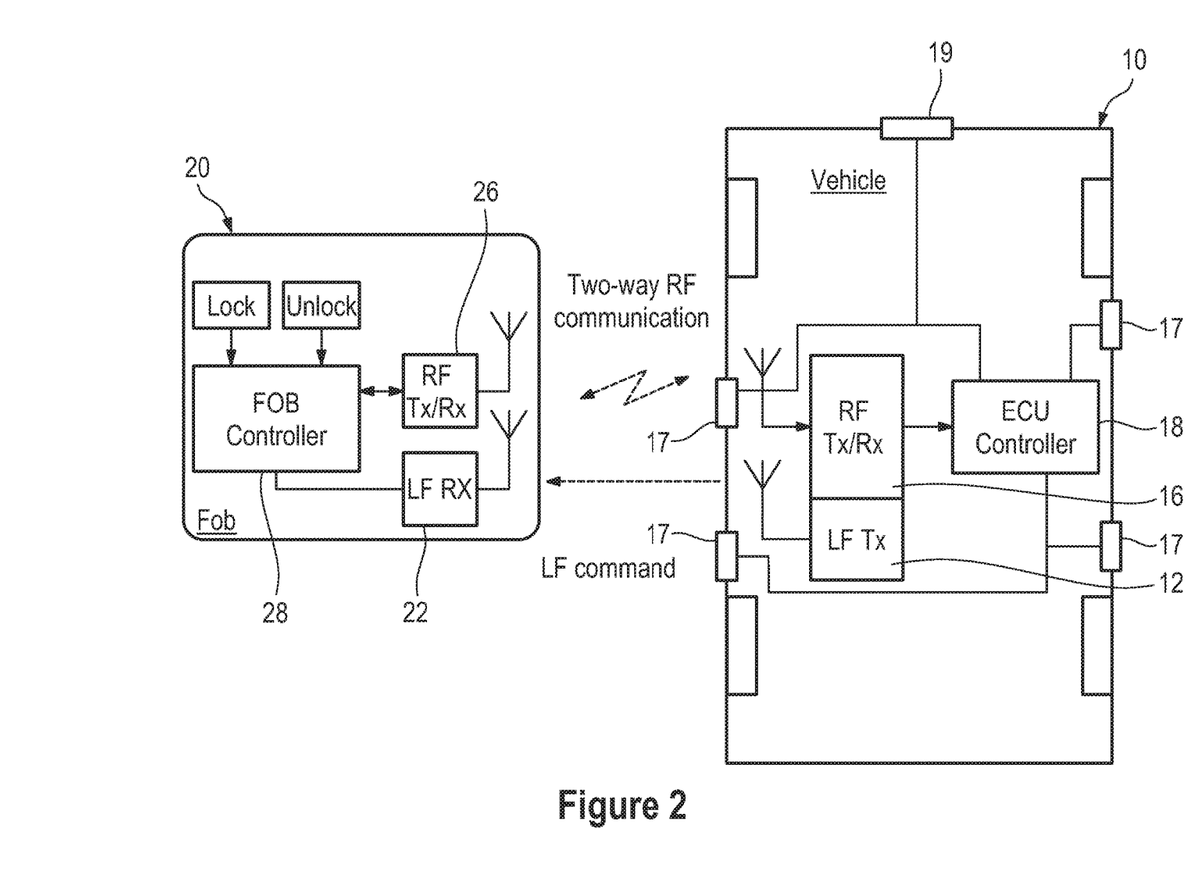
FIG. 2 is a schematic drawing showing the main features of the system according to a first embodiment of the invention.

FIG. 2 is a schematic drawing showing the main features of a system according to a first embodiment of the invention.

A vehicle 10 includes an electronic lock control system comprising a low-frequency transmitter 12, a radiofrequency transmitter and a radiofrequency receiver which are here shown combined as an RF transceiver 16, and a controller or ECU 18. The low frequency transmitter will typically operate at or in the region of 125 kHz, although other suitable low frequencies can be used provided that they conform to the radio regulations of the country/territory where the vehicle will be used. The RF transceivers will typically operate on a suitable UHF carrier frequency such as 315 MHz in the US/Japan, or around 433/434 MHz (e.g. 433.92 MHz) in Europe. Signals may be modulated onto these carriers using amplitude shift keying (ASK), and typically the amplitude is modulated between two levels. To save power, the lower level of the ASK modulation scheme may be zero or near zero, giving rise to what is known as on-off keying, OOK. For some countries, such as Japan, it may be preferred to use frequency-shift keying rather than ASK.

The RF transmitter and receiver, or transceiver if that is used instead of separate devices, preferably use a crystal-controlled oscillator rather than, say, a SAW device, because the use of crystal-controlled oscillators tends to give much better frequency stability which is beneficial in many ways.

The vehicle also includes sensors 17 for each of the door handles, and a sensor 19 for the handle of the trunk, which are connected to the controller 18. The sensors may be capacitive sensors, that respond to touch or to the close proximity of the user's hand for example, or they may be mechanical and respond to the action of a handle being grasped or a button pressed, for example.

A fob 20, that is paired with the vehicle 10, includes a low frequency receiver 22, an RF transmitter and an RF receiver which is here shown combined as an RF transceiver 26, and a fob controller 28. Preferably the RF transmitters in the fob and the vehicle operate at the same frequency, so that attackers cannot discriminate between signals from the fob and from the vehicle based on frequency. Again, it is preferred to use crystal-controlled oscillators in the RF transmitter and receiver, or transceiver if used instead of a pair of devices.

In normal operation, when the vehicle owner approaches the vehicle and lifts the door handle, the door handle sensor 17 responds by sending a signal to the controller 18. The controller 18, recognizing the signal from the door sensor 17 as a trigger for unlocking the door, actuates the low-frequency transmitter 12 to transmit a wake-up signal to the fob 20. The fob's low frequency receiver 22 receives the wake-up signal which is fed to the fob controller 28. On receiving the wake-up signal, the fob's controller turns on the fob's RF transceiver 26 to transmit a response to the vehicle. This response signal is received by the radio frequency receiver of the vehicle and passed to the vehicle's controller 18. If the fob is paired with the vehicle, the controller 18 will recognize a code sequence in the response signal—and are generally also a counter or rolling code with a suitable value, and will respond to the receipt of the fob's response signal. But at this stage, the controller does not unlock the door.

Instead, the controller 18 of the electronic lock sends an encrypted message to the fob's controller 28, using the vehicle's RF transmitter and the fob's RF receiver. This encrypted message specifies parameters for a two-way RF communication sequence to be performed between the fob and the vehicle. The fob's controller 28 and the vehicle's controller 18 each possess suitable encryption keys or secrets so that they can exchange encrypted messages. Preferably, the encryption keys are specific to a given vehicle rather than being shared between many vehicles, as this can improve overall security significantly.

Figure 3:
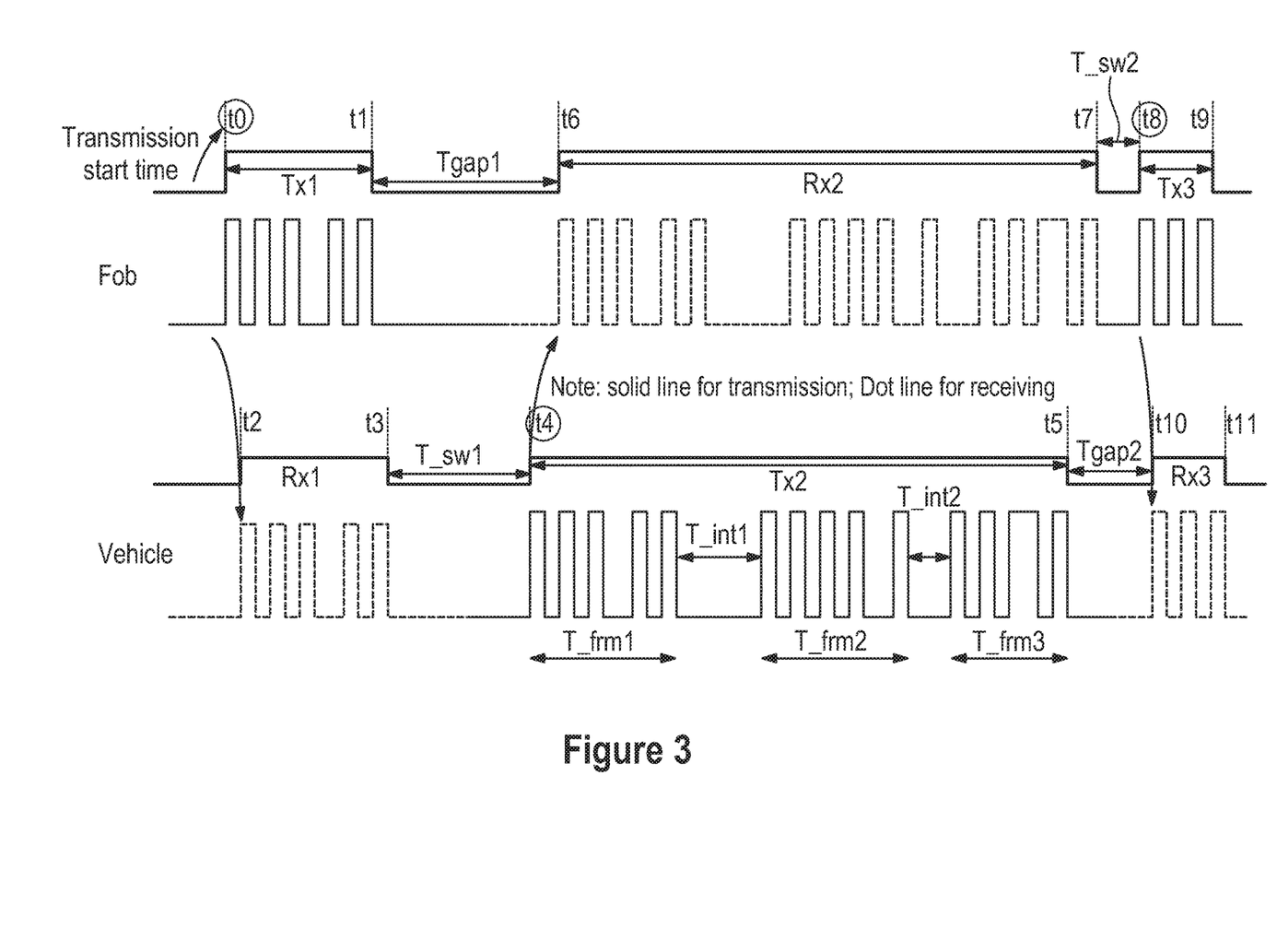
FIG. 3 is a schematic drawing illustrating one possible example of communication timing in a system according to an embodiment of the invention.

Before unlocking the door, the vehicle's controller takes part in this two-way RF communication sequence. Only if that communication sequence is completed successfully will the vehicle's controller unlock the electronic lock of a door. For the purpose of description, communications from the fob to the vehicle are considered to be forward communications, while communications from the vehicle to the fob, with the fob in receiving mode, are considered to be backward communication. FIG. 3 illustrates an example of a fob and vehicle communication sequence subsequent to the fob receiving the encrypted instructions about the parameters of the two-way communication sequence.

In FIG. 3 the upper part represents the behavior of the fob 20, with the topmost plot being a timeline, and the adjacent plot representing signals transmitted and received by the fob 20. In the signal plot, the solid line represents signals transmitted by the fob, while the dotted line represents signals transmitted by the vehicle and received by the fob. The lower part FIG. 3 represents the behavior of the vehicle's RF transmitter and receiver 16. In the example shown in FIG. 3, the first communication is shown as being from the fob to the vehicle, but the first communication of the sequence may equally well come from the controller 18 of the lock.

In FIG. 3, the fob is shown transmitting a message comprising a frame which includes a particular sequence of bits. In this example ASK is used, but other types of modulation can be used instead. In this example, the ASK modulation is represented as on off keying (OOK), with the bits representing binary ones and zeroes, the zeroes being signaled by a gap in transmission. Because in this case the message comprises just a single frame, the frame's length determines the message duration Tx1. The lock installation, shown here as "vehicle" responds to receiving the first message of the sequence with the second message of the sequence—shown here as a set of three frames T_fm1, T_fm2, T_fm3, separated by inter-frame intervals T_int1, and T_int2. In this example, the inter-frame intervals are unequal, with the first interval being more than twice the length of the shorter interval. The intervals may be made the same or similar in length, but generally it is preferred to use different length inter-frame intervals within a given message as this makes it harder for thieves to launch an effective relay attack. There may be more than three frames in a message, and the inter-frame intervals may all be the same length (duration) or may all be of different lengths (durations) or the same length (duration) may be used for more than one inter-frame interval with a different length, longer or shorter, used for other(s) of said intervals. It can also make it harder to launch an effective relay attack if the inter-frame intervals in different messages of the sequence also differ.

The identity of the source of the first transmission of the sequence is one (F1) of the parameters defined when the controller 18 of the electric lock sends an encrypted message to the fob's controller 28.

Other Parameters that May be Specified Include:

F2: Transmission start time: t0, t4 and t8. In FIG. 3, for a passive system, the LF command from the vehicle side enables the fob clock to start and the fob starts to transmit a first message at t0. For a normal two-way RKE system, a button press initiates the sequence and finishes at t1. The first transmission message length could contain encrypted information of the variable timing such as the starts and lengths of all incoming messages, the intervals among the frames within each one way message, the switch times of the communication direction changes. This first message length is shown as Tx1, and this length can be varied between different sessions. After t1, the fob is switched into the receiving mode and expecting the signal from the vehicle to arrive after Tgap1. There is delay from the start of the transmission t0 at the fob side to the output of the receiver at vehicle side at t2. This delay (t2-t0) is due to the signal travel time in the air and the hardware delay at the receiver side (if count the t0 as the start of the Fob transmission at its output). The same applies to the delay from t4 to t6 (vehicle to the Fob side).

F3: Switch time T_sw and gap time T_gap: the vehicle side will finish receiving the first fob message Tx1 at t3. Then the vehicle side device will start transmitting at time t4. The difference between (t4-t3) is called communication direction switch time T_sw1=(t4-t3). The Tgap1 time is related to (t4-t3). The Tgap1 is larger than T_sw1 due to the signal travel in the air and hardware processing delay, but their difference is almost constant number when the Fob is not too far away from the vehicle (very short air travel time). The values of the end time t3 and the start time t4 obviously determine the communication switch time and Tgap1. These numbers are variables for each event and form a secret only known by the paired fob and vehicle through pre-arrangement or through encrypted information included in transmission Tx1 or a prior LF message. This is intended to prevent the attacker from predicting the start of communication direction switch time. T_sw1 may be designed as short as possible, so it doesn't give too much time for attackers to access the timing. This is likely to force the attacker to relay both sides within a certain time window, leading to signal distortion or the risk of missing part of the transmission if switching is done too early or too late.

F4: Transmission frame number, durations and intervals between frames: In the Tx2 message transmitted from the vehicle, there are three transmission frames: T_frm1,T_frm2 and Tfrm3 and two silent intervals (inter-frame intervals) between frames: T_int1 and T_int2. The lengths of these frames and intervals are preferably always changing, differing from one event to the next so that attackers can't, based on past data, predict the end of the current direction of transmission. Therefore, the attacker may not have sufficient time to switch direction of relaying information. The intervals between different frames can be different. The length of one of the intervals could be designed to be comparable to the communication direction switch time T_sw so that the attacker can't, based on the duration of the silent time, determine if there is still another frame coming in the same direction transmission message or the system is going to switch communication direction.

F5: The number of frames. In FIG. 3, there is only one frame from the fob transmission to vehicle (Tx1). There are three frames from the vehicle to the fob during Tx2 time. These numbers could be varied for different events. In this manner, another level of difficulty is introduced, making it harder for the attackers to guess when the one direction transmission is going to end and when they should be ready for switching relay direction.

Preferably, in embodiments of the invention, the switch timing from one communication direction (such as from a Fob to the vehicle) to the other direction (such as from the vehicle to a fob) is changed for each unlocking event. This timing is only known by the paired fob and the vehicle by either a predetermined arrangement or through an initial encrypted communication. This make it more difficult for attackers to succeed if they relay information in only one direction at a time. Furthermore, because the communication switch time is arranged in such way that the scale of the switch time is comparable to the interval between frames in each transmission message, attackers cannot tell whether the silent time from one side's communication is merely a brief pause of the transmission (an inter-frame interval) or the start of switching the transmission direction (an inter-message interval). This may force the attackers to relay information from both ends of the system until they can be certain that the direction of transmission has changed.

The system is preferably configured so that the lock is only successfully unlocked in the event that the entire loop communication is correct—that is, the vehicle side receiving the fob side information correctly and the fob side receiving the vehicle side transmission correctly. Here, "correct" may mean with no detection errors or with an acceptably low bit error rate in both directions in order to confirm it is legitimate fob and there is no relay or very minimal possibility of a relay attack. With such a configuration, If there is a failure in the loop, the system may retry the process. After a further failure, the system may adopt a "frozen" state in which no unlocking of the system is possible using PKE for a set period of time—say 10 minutes—and/or an alarm may be triggered. Alarm triggering may involve the vehicle's horn sounding and lights flashing and/or a silent alarm in which the event is reported to a security provider. In either case, the vehicle's internal information systems may be arranged to display a "break in attempt" message when the owner does return and unlock the vehicle.

(F5) the number of transmissions, or messages, that will make up the sequence—although this may in some embodiments be a fixed number instead, which does not therefore need to be specified in a message.

These functions, F1, F2, F3, F4 and F5, or a suitable subset of them may be specified in the initial encrypted message, and one or more of them changes from one event (one vehicle access) to another. in order to actuate the lock and thereby gain access to the vehicle, the communication between the fob and the vehicle according to the specified communication sequence must be completed. Any interruption of the communication will result in failure to obtain access to the vehicle (or whatever else is protected by the electronic lock that the fob controls).

The transmissions from the vehicle may be used to confirm successful reception of messages from the fob. If the initial message in the sequence of messages is sent by the vehicle, the initial message may act as a hand shake message to trigger the fob to warn it of the start of transmission. The fob controller may be configured to halt the message sequence if the fob does not receive the expected messages from the vehicle at the right time and with a low enough bit error rate. For example, referring to FIG. 3, after Tsw1 (Tgap1) time, for a successful message sequence, the fob needs to receive the vehicle transmission Tx2 correctly, especially the start of the message Tx2. Message Tx2 may function here to confirm that the vehicle has recognized the Fob. The attacker will not know when the vehicle will start transmission, due to the lacking knowledge of the length of Tx1 and when the fob transmission will end. (F4: variable frame lengths and F5: number of frames. Tx1 could have 3 frames in the next event). Consequently, the attackers may (1) end relay from the fob to the vehicle side too early, in order to get ready to relay from the vehicle to the fob, and miss the end of the fob's first transmission or (2) end a relay from the fob to the vehicle side too late and not be ready for the vehicle side transmission, leading to missing the first part of the Tx2 message or (3) start to relay both sides at the same time, which causes the signal symbol distortion or swamping.

Timings may be based on absolute time, the fob and the lock installation having clocks that are synchronized periodically—for example during the fob wake up procedure. Or timings may be based on relative times—for example, the fob may determine the timings of its own actions by reference to its detection of events or features in messages or other signals received from the lock installation (vehicle).

Figure 4:
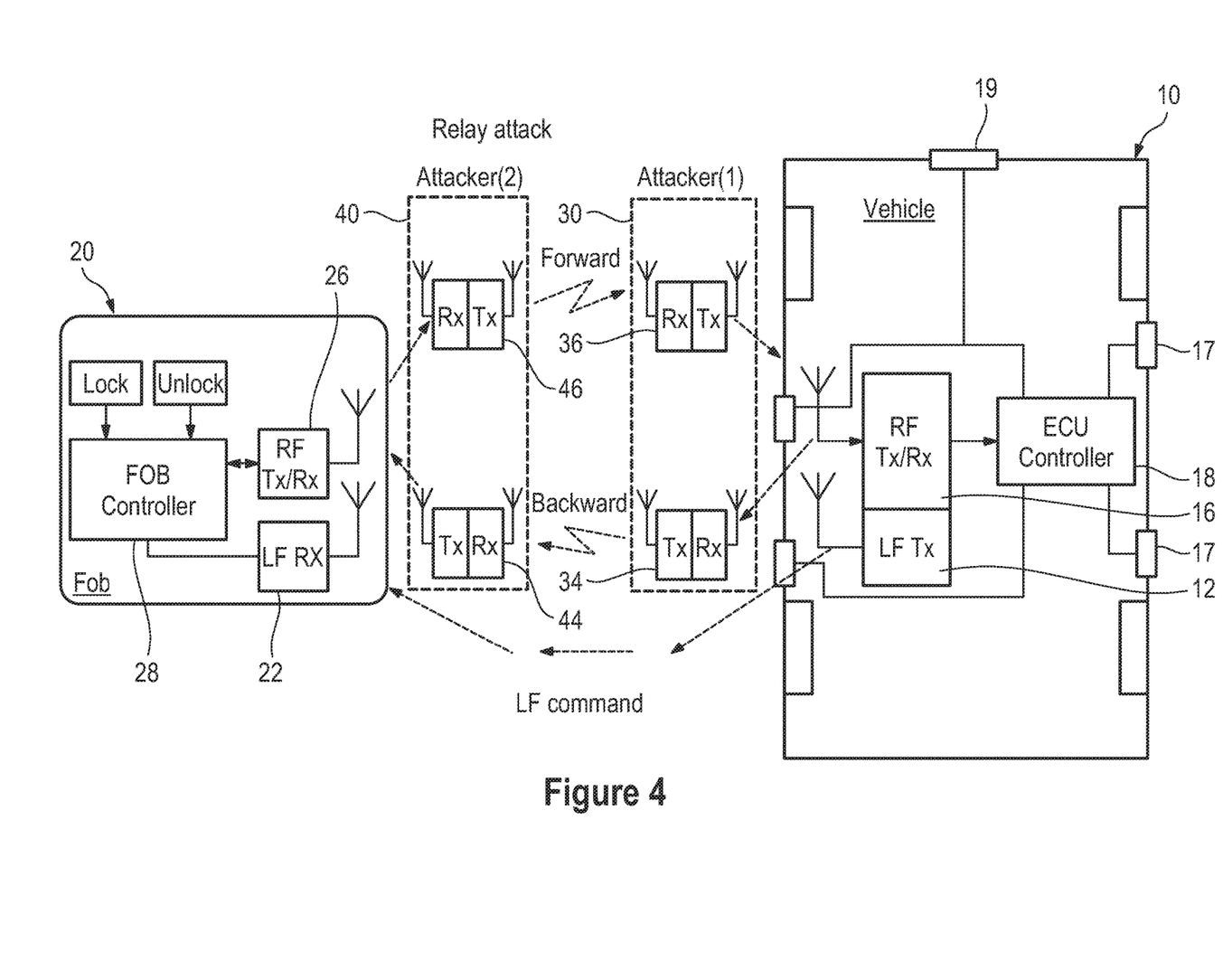
FIG. 4 is a schematic drawing illustrating how a relay attack might work with the system according to an embodiment of the invention.

Let us consider now how thieves might attempt a relay attack on the system as shown in FIG. 2. FIG. 4 illustrates a situation in which a relay attack is attempted. For simplicity, the attacker's equipment is shown without any low-frequency componentry although this will in practice be present to enable the low-frequency wake up signal from the vehicle to be passed to the remote fob, unless the low frequency signal from the vehicle is transmitted to the second attacker by means of cable. Once again, a first attacker stands close to the vehicle to capture signals from the vehicle and to provide the vehicle with signals from the fob. The first attacker's equipment 30 includes two pairs of transmitters and receivers (shown as transceivers 34 and 36), one pair to enable signals to be captured from the vehicle to be passed to the second attacker, the other pair of which is used to receive signals captured and retransmitted by the other attacker and to transmit these to the vehicle. The second attacker's equipment 40 is similar, with two pairs of transmitters and receivers (shown as transceivers 44 and 46). If the attackers knew when the vehicle and the fob were each transmitting, each attacker's equipment would only need one transmitter receiver pair which would be turned to the appropriate mode according to whether signals were coming from the vehicle or the fob. But because the sequence of forward and backward transmissions and its timings change with every vehicle access event, the attackers need to be able to gather forward and backward transmissions at any time, and onward transmit these transmission, this means that their equipment needs to be more complicated. Because the attackers don't know when forward and backward transmissions will occur, the first attacker needs to capture signals transmitted from the vehicle while also transmitting signals received from the second attacker corresponding to forward transmissions captured from the fob. Similarly, the second attacker needs to capture signals transmitted from the fob, forward transmissions, while also transmitting signals received from the first attacker, representing backward transmissions. The consequence is that a feedback loop is created.

Figure 5:
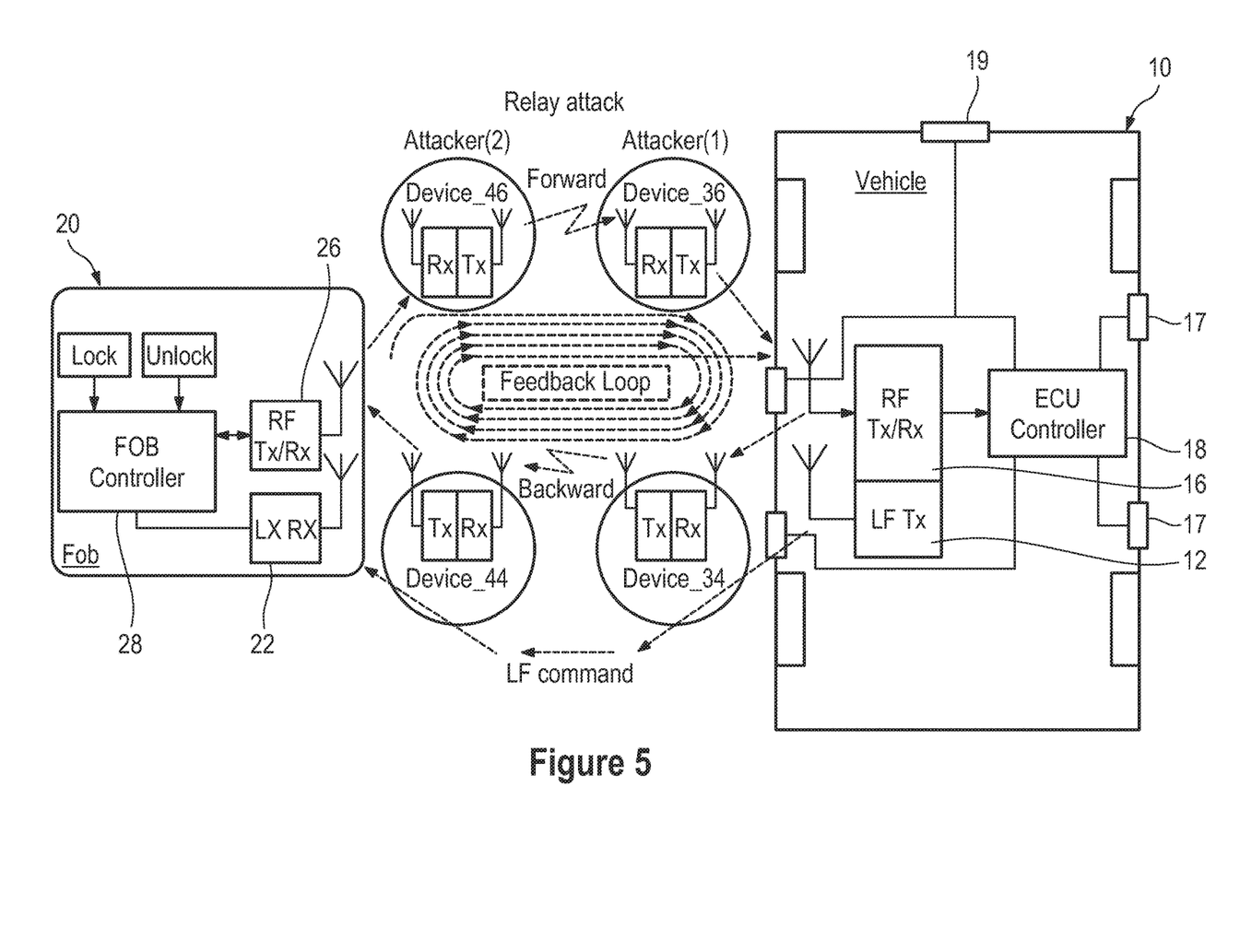
FIG. 5 is a schematic drawing illustrating how a feedback loop might arise with the relay attack as shown in FIG. 4.

FIG. 5 illustrates schematically the creation of just such a feedback loop. When the fob 20 transmits a signal from its transceiver 26, a forward transmission, the second attacker receives that signal with a receiver transmitter pair 46 and then transmits the information from the fob to the first attacker who receives the information via transceiver 36. The first attacker receives the transmitted signal from the second attacker and transmits the received signal to the vehicle, mimicking the forward transmission from the fob 20. The first attacker's transceiver 34, which is listening for transmissions from the vehicle, also picks up transmissions from the other transceiver 36 of the attacker's device 30. Since the first attacker's device cannot distinguish the difference between the transmissions from its own transceiver 36 and possible vehicle side transmissions, it transmits and relays this feedback signal back to the receiver of the second attacker's device 44. The second attacker's device 40 cannot distinguish between the feedback signal and a backward vehicle transmission, and therefore retransmits it to the fob 20. This feedback signal, transmitted by the transmitter of device 44 is received by the receiver of device 46 which is listening for forward transmissions from the fob. This process continues for as long as the two attackers' equipment is listening and transmitting. The effect of this repeated feedback is illustrated schematically in FIG. 6.

Figure 6:
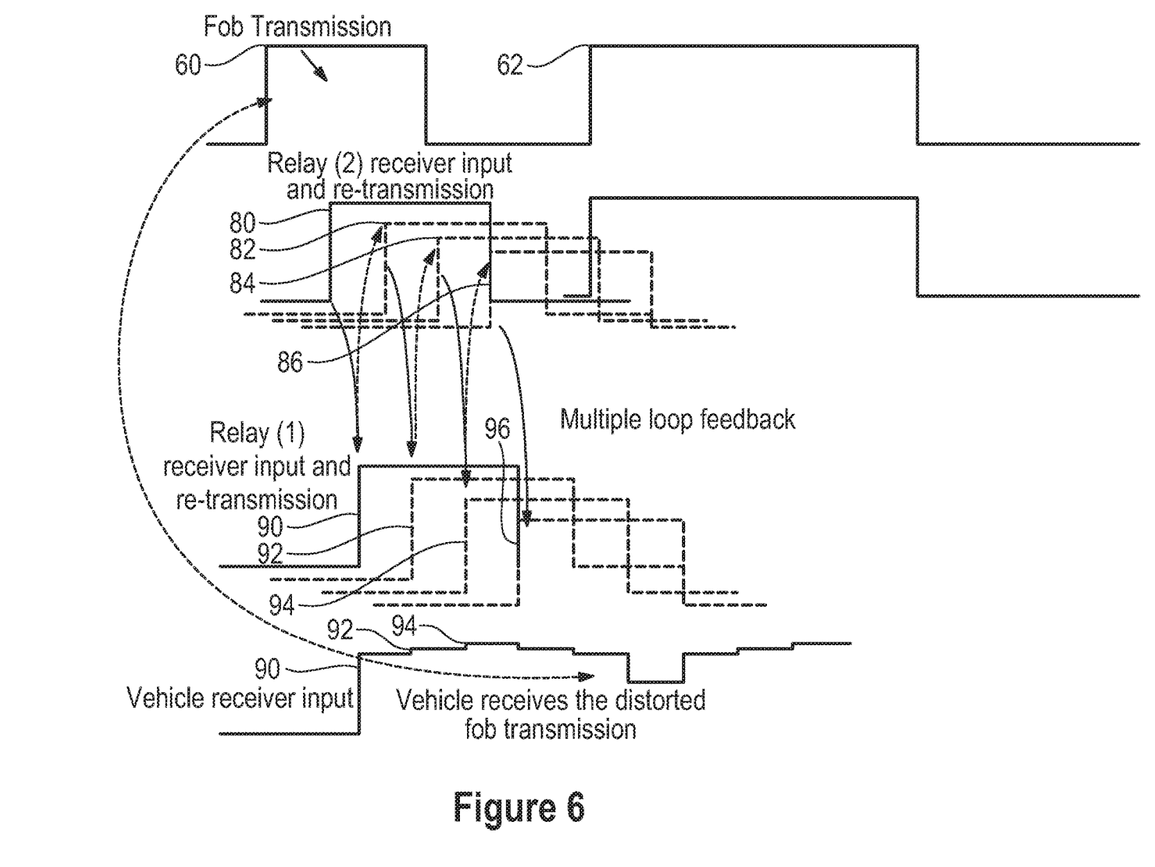
FIG. 6 is a schematic drawing illustrating how multiple feedback loops such as might arise in an attack according to FIG. 4 might distort RF transmissions from the fob as detected at the vehicle.

In FIG. 6, the fob 20 transmits an initial pulse 60, and a subsequent pulse 62, as shown in the top line of the diagram. The second attacker's equipment 40 receives the initial pulse 60 and relays it as pulse 80 to the first attacker's equipment 30. The first attacker's equipment 30 then transmits the received pulse as pulse 90. Pulse 90 is fed back from the first attacker's equipment 30 to the second attacker whose equipment then retransmits that pulse which is received by the second attacker's equipment as another forward transmission. The second attacker's equipment therefore transmits that pulse as pulse 82 which is relayed to the first attacker's equipment where it is retransmitted as pulse 92. The consequence is that the vehicle receiver sees a composite pulse that spreads much wider than the fob's original pulse, so that the vehicle's controller 18 will not recognize the signals received as corresponding to those required by the sequence that was established for this event. As a consequence, the controller 18 of the electronic lock will not unlock the lock, and the thieves will not obtain access to the vehicle.

When considering the durations of frames, messages, inter-frame intervals, and transmission switches, processing will generally be made easier if the various durations are each chosen from a known set of durations—rather than being freely chosen from the continuum of possible times. For example, in a system according to an embodiment of the invention the quickest that a system mode switch can be made may be 1 ms: so the set of possible durations of $T\_sw1$ and or $T\_sw2$ may be $\{1$ ms, $1.1$ ms, $1.2$ ms, $1.3$ ms$\}$—with each set of sequence parameters for a given fob/lock installation pairing specifying $T\_sw1$ and or $T\_sw2$ as values selected from this set.

Similarly, the set of frame lengths might be chosen to be $\{2$ ms, $2.2$ ms, $2.5$ ms, $3$ ms, $4.2$ ms, $4.5$ ms, $5$ ms, $7$ ms, $10$ ms$\}$ Similarly, the set of inter-frame intervals might be $T\_int1$ from $\{1$ ms; $1.2$ ms, $1.3$ s, $1.4$ ms, $1.5$ ms, $2.2$ ms, $3$ ms, $4$ ms$\}$ $T\_int2$ from $\{1$ ms; $1.2$ ms, $1.3$ s, $1.4$ ms, $1.5$ ms, $2.2$ ms, $3$ ms, $4$ ms$\}$ although it could be decided that different sets of durations might be chosen for different inter-frame intervals. As noted above, in general it is preferable for the durations of inter-frame intervals in a message containing two or more such intervals to include different values.

As already indicated, launching a successful relay attack is much harder if the parameters specified for the message sequence result in the interval between messages, the inter-message interval, being comparable in length to the inter-frame intervals used. For this reason it is preferred for the parameters to be specified to give an inter-message interval that is less than at least one of the inter-frame intervals in one or more of the messages in the sequence.

Typically the transmission data rate will be in the region of 20 kbits/s 50 µs/bit)—and the controllers of the fob and of the lock installation may be set up to accept a maximum bit width error of say 10%—55 µs. Thus, if a received bit length is longer than 55 µs, the relevant controller may be set not to accept the received signal as matching. Clearly, this requires quite high timing accuracy on the electronics of the fob and of the lock installation—since a timing error in transmission of more than 5 µs would result in failure to unlock even in the absence of a relay attack. The expense of providing high-speed electronics in the fob and lock installation to ensure this level of accuracy will in general be justified because these same timing constraints make it much harder for thieves to launch an effective relay attack.

Figure 7:
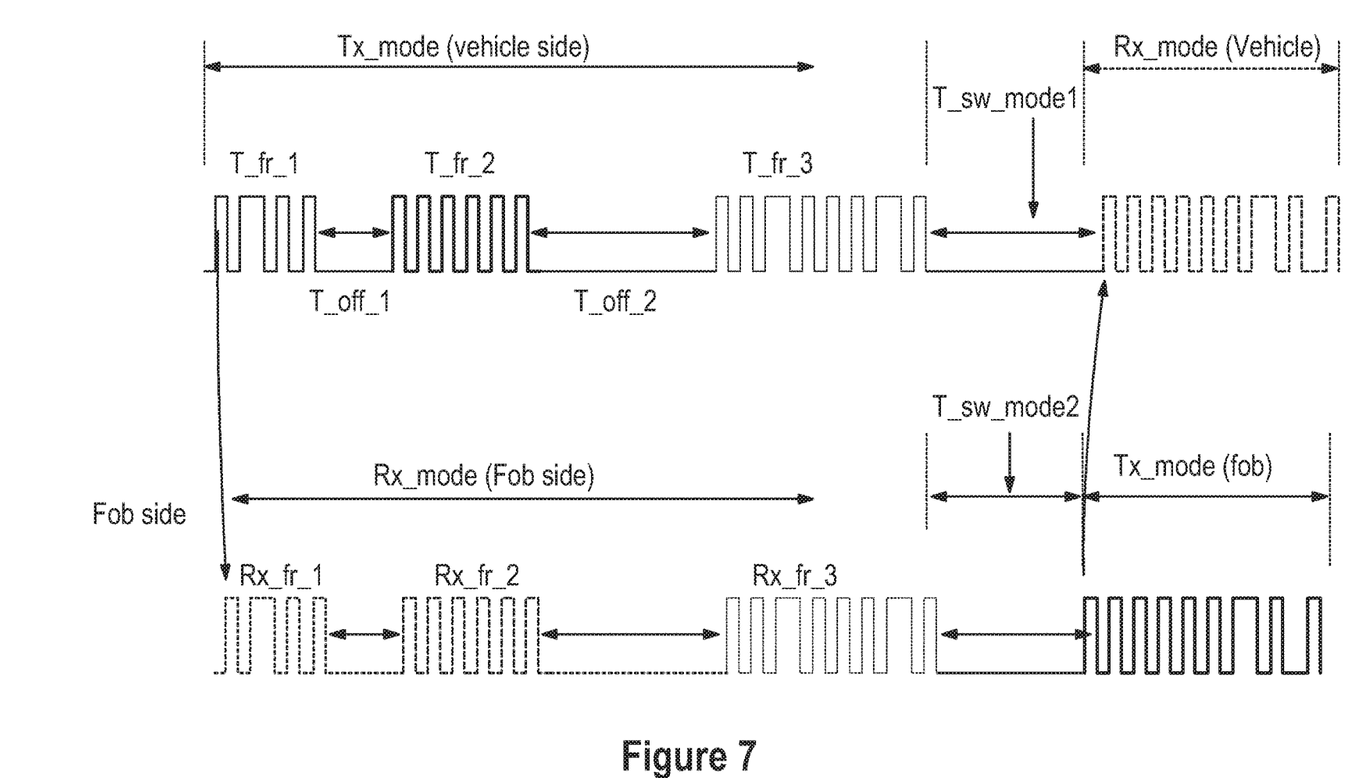
FIG. 7 a schematic drawing illustrating another example of communication timing in a system according to an embodiment of the invention.

FIG. 7 corresponds generally to FIG. 3, but shows the first message of the message sequence coming from the lock installation (vehicle) rather than from the fob. It will be noted that the first message comprises three frames separated by two inter-frame intervals, Tx_mode time (the duration of a message of the sequence) is determined by the parameters specified for the sequence and variable and unpredictable; the inter-message interval T_sw_mode is less than the inter-frame interval T_off_2.

Preferably, in embodiments of the invention, the message sequence to be exchanged between the lock installation and the fob includes at least two messages from each of the lock installation and fob. A second exchange of messages in the message sequence may take place using a different carrier frequency from that used for a first exchange of messages—the change in carrier frequency being one of the parameters specified for the sequence. If more than two exchanges of messages take place, one of these may be at a different power to another (changing either or both of the power from the fob or the lock installation).

In general, as described with reference to the figures, the secret that specifies the parameters for the sequence of messages to be exchanged bidirectionally between the lock installation and the fob, is passed from the lock installation to the fob in the lock installation's first message of the sequence or in an earlier message—passed for example using a low frequency transmitter of the lock installation. But it is possible to engineer a system in which the secret is introduced into a lock installation and its paired fob before they are installed, for example as part of the manufacturing process, or during commissioning. This is generally a less preferred option, but does avoid the need for the secret to be transmitted from the lock installation to the fob for every unlock event.

What is claimed is:

1. A passive keyless entry system for an electronic lock, the system comprising:
    a lock installation including a first controller, a first RF transmitter and a first RF receiver; and
    a fob including a fob controller, a second RF transmitter and a second RF receiver, the fob being configured to generate messages to unlock the lock in an unlock event;
    wherein:
    the first controller and the fob controller share a secret that specifies parameters for a sequence of messages to be exchanged bidirectionally between the lock installation and the fob using the first RF transmitter and the second RF receiver, and the second RF transmitter and the first RF receiver, the parameters changing between each unlock event and an immediately subsequent unlock event;
    wherein for each unlock event one of the first controller and the fob controller is configured to generate a first message of the message sequence, in accordance with the specified parameters, and to cause one of the first or second RF transmitter to transmit the first message of the sequence in accordance with the specified parameters;
    and the other of the first controller and the fob controller is configured to control the other of the first RF transmitter and the second RF transmitter to transmit a second message of the sequence in accordance with the specified parameters, in response to receiving the first message of the sequence; and the first controller is further configured only to unlock the electronic lock in the event that the or each message transmitted by the fob as required by the sequence is correctly received by the first receiver; and wherein
    at least one message of the sequence of messages comprises a plurality of frames, each frame including a particular sequence of bits, adjacent frames of the plurality of frames being separated from each other by an inter-frame interval;
    adjacent messages in the sequence of messages being separated from each other by an inter-message interval;
    and the specified parameters are such that a given message of the sequence includes a first inter-frame interval, and the inter-message interval between said given message of the sequence and at least one of an immediately preceding and an immediately subsequent message is no longer than said first inter-frame interval.

2. A passive keyless entry system as claimed in claim 1, wherein said given message of the sequence of messages includes at least three frames, and different pairs of adjacent frames are separated by inter-frame intervals having different durations.

3. A passive keyless entry system as claimed in claim 2, wherein an inter-message interval between said given message of the sequence and an immediately preceding or immediately subsequent message of the sequence has a duration intermediate the durations of the inter-frame intervals of said given message of the sequence of messages.

4. A passive keyless entry system as claimed in claim 1, wherein the first controller is configured to share the secret between the first controller and the fob controller by controlling the first RF transmitter to send to the second RF receiver a first encrypted message specifying the parameters for the sequence of messages.

5. A passive keyless entry system as claimed in claim 4, wherein the first controller is configured to specify a different set of parameters for each attempt to unlock the electronic lock.

6. A passive keyless entry system as claimed in claim 4, wherein the parameters specified in the given message include at least one of:
    an indication whether the first or the second RF transmitter is to transmit a first message of the sequence; a start time for each message in the sequence; a duration for each message in the sequence; a duration for an inter-frame interval between adjacent messages in the sequence.

7. A passive keyless entry system as claimed in claim 6, wherein the parameters specified in the given message include an indication whether the first or the second RF transmitter is to transmit a first message of the sequence; and at least one of a start time for each message in the sequence and a duration for each message in the sequence.

8. A passive keyless entry system as claimed in claim 4, wherein the first controller is configured to control the first RF transmitter to send to the second RF receiver the given message specifying parameters for a sequence of messages only after the first controller has recognized the fob as having been paired with the first controller.

9. A passive keyless entry system as claimed in claim 8, wherein the lock installation additionally includes a low frequency transmitter to transmit a wake up message to the fob.

10. A passive keyless entry system as claimed in claim 1, wherein the first RF transmitter and the first RF receiver are configured as a first RF transceiver.

11. A passive keyless entry system as claimed in claim 1, wherein the second RF transmitter and the second RF receiver are configured as a second RF transceiver.

12. A passive keyless entry system as claimed in claim 1, wherein the electronic lock is a lock of a vehicle.

13. A passive keyless entry system as claimed in claim 1, wherein the first and second RF transmitters operate on the same RF carrier frequency.

14. An electronic lock installation configured for passive keyless entry, the lock installation including:
an electronic lock, an RF transmitter and an RF receiver for communication with a fob that is configured to generate messages to unlock the lock in an unlock event, and a controller operatively coupled to the lock, the RF transmitter and the RF receiver; wherein the controller shares a secret with the fob, the secret specifying parameters for a sequence of messages to be exchanged bidirectionally between the lock installation and the fob using the RF transmitter and the RF receiver, the parameters changing between each unlock event and an immediately subsequent unlock event;
control the RF transmitter to send to the fob at least one message of the sequence in accordance with the specified parameters;
control the RF receiver to receive at least one message of the sequence transmitted by the fob in accordance with the specified parameters;
and wherein at least one message of the sequence of messages comprises a plurality of frames, each frame including a particular sequence of bits, adjacent frames of the plurality of frames being separated from each other by an inter-frame interval;
adjacent messages in the sequence of messages being separated from each other by an inter-message interval;
and the specified parameters are such that a given message of the sequence includes a first inter-frame interval, and the inter-message interval between said given message of the sequence and at least one of an immediately preceding and an immediately subsequent message is no longer than said first inter-frame interval, and
the controller is further configured only to unlock the electronic lock in the event that the or each message transmitted by the fob as required by the sequence is correctly received by the RF receiver.

15. An electronic lock installation as claimed in claim 14, wherein the secret is shared between the first controller and the fob controller by the first controller controlling the first RF transmitter to send to the second RF receiver an encrypted message specifying the parameters for the sequence of messages.

16. An electronic lock installation as claimed in claim 15, wherein the controller is configured to specify a different set of parameters for each attempt to unlock the electronic lock.

17. An electronic lock installation as claimed in claim 15, wherein the controller is configured to send a new encrypted message, specify a different set of parameters, for each attempt to unlock the electronic lock.

18. An electronic lock installation as claimed in claim 15, wherein the parameters specified in the first message include at least one of:
an indication whether the fob or the RF transmitter is to transmit a first message of the sequence; a start time for each message in the sequence; a duration for each message in the sequence; a duration for an interval between adjacent messages in the sequence.

19. An electronic lock installation as claimed in claim 18, wherein the parameters specified in the first message include an indication whether the fob or the RF transmitter is to transmit a first message of the sequence; and at least one of a start time for each message in the sequence and a duration for each message in the sequence.

20. A fob for a passive keyless entry system for an electronic lock, the fob including a fob controller, a low frequency receiver, an RF transmitter and an RF receiver, the fob being configured to generate messages to unlock the lock in an unlock event; wherein:
the fob controller and a lock installation of the electronic lock share a secret specifying parameters for a sequence of messages to be exchanged bidirectionally between the lock installation and the fob, using the RF transmitter and the RF receiver, at least one of the messages of the sequence being specified as coming from the fob, the parameters changing between each unlock event and an immediately subsequent unlock event;
at least one message of the sequence of messages comprises a plurality of frames, each frame including a particular sequence of bits, adjacent frames of the plurality of frames being separated from each other by an inter-frame interval;
adjacent messages in the sequence of messages being separated from each other by an inter-message interval;
the specified parameters are such that a given message of the sequence includes a first inter-frame interval, and the inter-message interval between said given message of the sequence and at least one of an immediately preceding and an immediately subsequent message is no longer than said first inter-frame interval;
the fob controller is configured to wake up in the event that the low frequency receiver receives a low-frequency wake up message from the lock installation, and to cause the RF transmitter to transmit a response to the installation, the response including a fob identifier; and
the controller is configured subsequently to control the RF transmitter to send to the lock installation the or each message of the sequence specified as coming from the fob, in accordance with the specified parameters.

21. A fob as claimed in claim 20, wherein the fob is configured to receive the specified parameters in an encrypted message from the lock installation.

22. A fob as claimed in claim 21, wherein the fob controller is configured to apply the specified parameters supplied in a given encrypted message to just one unlock event.

23. A method of preventing a successful relay attack on a passive keyless entry system for an electronic lock of a lock installation, the system including a fob configured to generate messages to unlock the lock in an unlock event, the method comprising:
for each unlock event controlling one of a first RF transmitter associated with the lock and a second RF transmitter of the fob to generate a first message of a message sequence, in accordance with parameters specified in a secret shared between a fob controller and a first controller of the lock installation;
controlling the other of the first RF transmitter and the second RF transmitter to transmit a second message of the sequence in accordance with the specified parameters, in response to receiving the first message of the sequence;

changing the sequence of parameters of the sequence for each iteration of the method, but each sequence interleaving transmissions from the first and second RF transmitters;

and only unlocking the electronic lock in the event that the or each message transmitted by the fob as required by the sequence is correctly received by an RF receiver of the lock installation;

wherein the specified parameters are such that a given message of the sequence includes a first inter-frame interval, and the inter-message interval between said given message of the sequence and at least one of an immediately preceding and an immediately subsequent message is no longer than said first inter-frame interval.

24. A method as claimed in claim 23, wherein said given message of the sequence of messages includes at least three frames, and different pairs of adjacent frames are separated by inter-frame intervals having different durations.

25. A method as claimed in claim 24, wherein an inter-message interval between said given message of the sequence and an immediately preceding or immediately subsequent message of the sequence has a duration intermediate the durations of the inter-frame intervals of said given message of the sequence of messages.

26. A method as claimed in claim 23, comprising:
controlling the first RF transmitter to send to the fob an encrypted message specifying the parameters for the sequence of messages.

27. A method as claimed in claim 26, comprising:
sending a new encrypted message, specify a different set of parameters, for each attempt to unlock the electronic lock.

28. A method as claimed in claim 26, wherein the parameters specified in the encrypted message include at least one of:
an indication whether the first or second RF transmitter is to transmit a first message of the sequence; a start time for each message in the sequence; a duration for each message in the sequence; a duration for an interval between adjacent messages in the sequence.

29. A method as claimed in claim 26, wherein the parameters specified in the encrypted message include an indication whether the fob or the RF transmitter is to transmit a first message of the sequence; and at least one of a start time for each message in the sequence and a duration for each message in the sequence.

\* \* \* \* \*